(12) United States Patent
Joseph

(10) Patent No.: US 8,727,640 B2
(45) Date of Patent: May 20, 2014

(54) DYNAMIC RANGE ALIGNMENT TOLERANT OPTICAL COUPLING FOR FIBER OPTIC COMMUNICATIONS

(76) Inventor: Angelica Simone Joseph, Sunnyvale, CA (US)

( * ) Notice: Subject to any disclaimer, the term of this patent is extended or adjusted under 35 U.S.C. 154(b) by 132 days.

(21) Appl. No.: 13/358,223

(22) Filed: Jan. 25, 2012

(65) Prior Publication Data

US 2013/0022314 A1 Jan. 24, 2013

Related U.S. Application Data

(60) Provisional application No. 61/462,021, filed on Jan. 27, 2011.

(51) Int. Cl.
*G02B 6/36* (2006.01)
*G02B 6/30* (2006.01)
*G02B 6/26* (2006.01)

(52) U.S. Cl.
USPC .............. 385/92; 385/33; 385/49; 385/51; 385/52; 385/91; 385/93; 385/94

(58) Field of Classification Search
USPC ............... 385/31, 33, 39, 49, 51–52, 88–94
See application file for complete search history.

(56) References Cited

U.S. PATENT DOCUMENTS

| | | | | |
|---|---|---|---|---|
| 3,637,993 | A * | 1/1972 | Christie et al. | 235/437 |
| 6,293,711 | B1 * | 9/2001 | Sasaki | 385/88 |
| 6,632,027 | B1 * | 10/2003 | Yoshida et al. | 385/88 |
| 6,863,449 | B2 * | 3/2005 | Kuhara et al. | 385/89 |
| 7,004,644 | B1 * | 2/2006 | Johnson | 385/89 |
| 7,267,494 | B2 * | 9/2007 | Deng et al. | 385/92 |
| 2005/0219511 | A1 * | 10/2005 | Jung et al. | 356/73 |
| 2006/0045143 | A1 * | 3/2006 | Anikitchev et al. | 372/9 |

* cited by examiner

*Primary Examiner* — Uyen Chau N Le
*Assistant Examiner* — Michael Mooney

(57) ABSTRACT

In one exemplary embodiment, an optical coupler of a fiber optic system can include a light-source input cavity packaged in an outer casing. The cavity can receive an optical signal from a light source. An optical collimator packaged in the outer casing such that a receiving end of the optical collimator can receive the light source from the light-source input cavity. The optical collimator can include at least one beam forming stage. The optical collimator can generate a collimated beam output from the optical signal. An optical cavity can receive the collimated beam output of the optical collimator. The optical cavity can be coaxially included in a receiving optical fiber coupled with the outer casing coupled with optical cavity. The optical cavity can receive the collimated beam output of the optical collimator and input the collimated beam into the receiving optical fiber.

12 Claims, 3 Drawing Sheets

DYNAMIC RANGE ALIGNMENT TOLERANT OPTICAL COUPLING FOR FIBER OPTIC COMMUNICATIONS

CROSS-REFERENCE TO RELATED APPLICATIONS

This application claims priority from U.S. Provisional Application No. 61/462,021, filed Jan. 27, 2011, The provisional application is hereby incorporated by reference in its entirety.

BACKGROUND

1. Field

This application relates generally to fiber optics, and more particularly to a system and method of dynamic range alignment tolerant optical coupling for fiber optic communications.

2. Background

In the current implementations, the input radiation from an optical source may not collimated as input into a fiber optic fiber(s). Typically, the radiation from the source may be focused using a lens. In both of these cases very precise alignment may be required to provide the maximum number of photons into the channel in the fiber optic core. Even if the cable is aligned properly, the attenuation of the optical energy received at the fiber cable core (opening) may be greater than 77 dB, The consequence of this poor reception is that the receiver may have to work very hard against the noise, jitter and poor dynamic range to extract the signal. Another major disadvantage of the current implementations is that the transmitter may operate at a very high power level to provide minimum detectable signal at the receiver.

BRIEF SUMMARY OF THE INVENTION

In one embodiment, an optical coupler of a fiber optic system can include a light-source input cavity packaged in an outer casing. The cavity can receive an optical signal from a light source. An optical collimator packaged in the outer casing such that a receiving end of the optical collimator can receive the light source from the light-source input cavity. The optical collimator can include at least one beam forming stage. The optical collimator can generate a collimated beam output from the optical signal. An optical cavity can receive the collimated beam output of the optical collimator. The optical cavity can be coaxially included in a receiving optical fiber coupled with the outer casing coupled with optical cavity. The optical cavity can receive the collimated beam output of the optical collimator and input the collimated beam into the receiving optical fiber.

BRIEF DESCRIPTION OF THE DRAWINGS

The present application can be best understood by reference to the following description taken in conjunction with the accompanying figures, in which like parts may be referred to by like numerals.

DESCRIPTION

Disclosed are a system, method, and article of manufacture of dynamic range alignment tolerant optical coupling for fiber optic communications. The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments.

Process Overview

Figure 1:
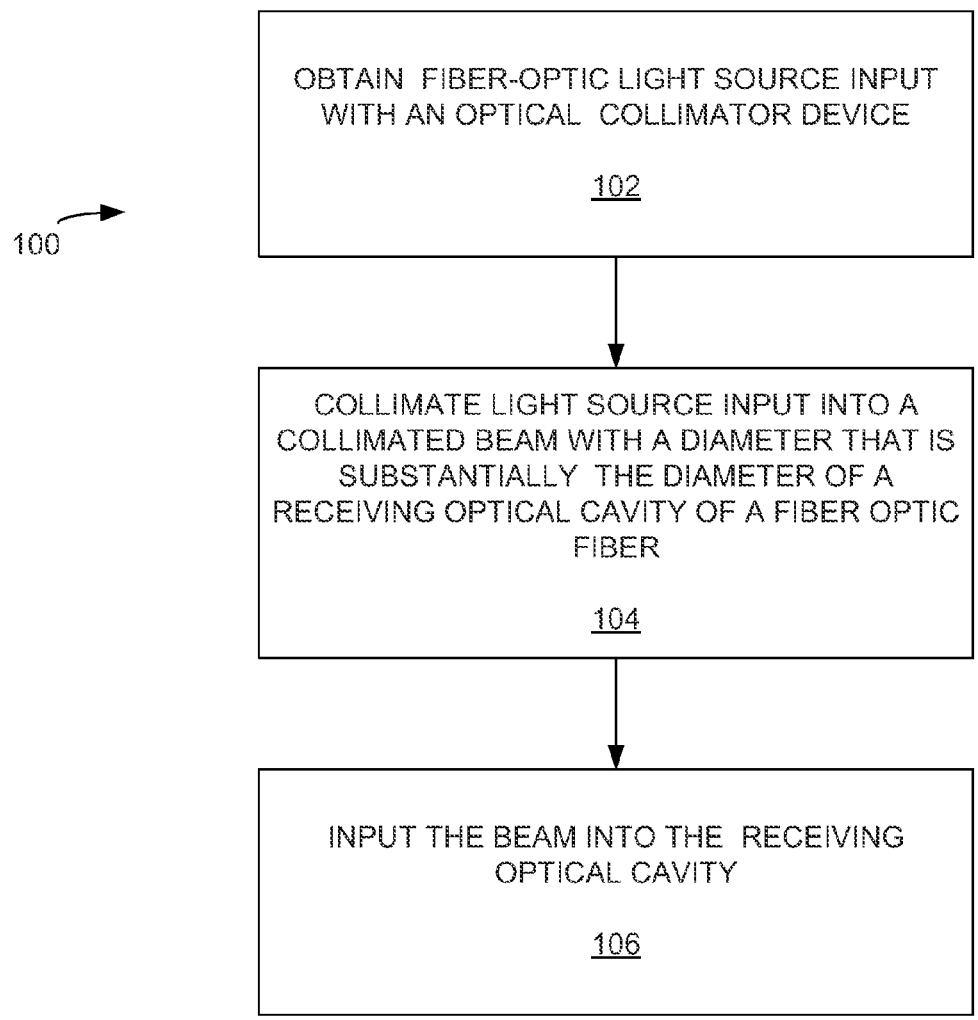
FIG. 1 depicts an example process of dynamic range alignment tolerant optical coupling for fiber optic communications.

FIG. 1 depicts an example process 100 of dynamic range alignment tolerant
optical coupling for fiber-optic communications. In step 102, a fiber-optic light source input is obtained with an optical collimator device. The fiber-optic light source can be any one of a tight source used as input for a fiber optic fiber such the radiation from an optical transmitter. Examples of light sources include, inter alia, distributed feedback (DFB) laser diode, a vertical-cavity surface-emitting laser (VCSEL) and the like. As used herein, an optical collimator device can include a device that narrows a beam of particles or waves. To "narrow" can mean either to cause the directions of motion to become more aligned in a specific direction (i.e., collimated or parallel) and/or to modulate the spatial cross section of the beam. Optionally, the radiation from the optical transmitter can be subject to additional steps such as focusing or defocusing the beam prior to input into the optical collimator. In step 104, the light-source input is collimated by the optical collimator device into a collimated beam. For example, the collimated beam may have a diameter that substantially the diameter of the receiving optical cavity of a fiber-optic fiber(s) (i.e. the target fiber optic fiber(s) of the optical transmitter). Optionally, the diameter of the collimated beam may be sized slightly larger than the diameter of the receiving optical cavity. In step 106, the collimated beam is input into the receiving optical cavity. It is noted that the optical collimator device can be include in the same package a coupling device that couples a fiber-optic light source with a fiber-optic fiber(s). As used herein a fiber optic cable can refer to a cable made up of super--thin filaments of glass or other transparent materials that can carry beams of light. A fiber-optic fiber can refer to Flexible transparent fiber devices used for information transmission, in which light is propagated by total internal reflection.

Exemplary Environment and Architecture

Figure 2:
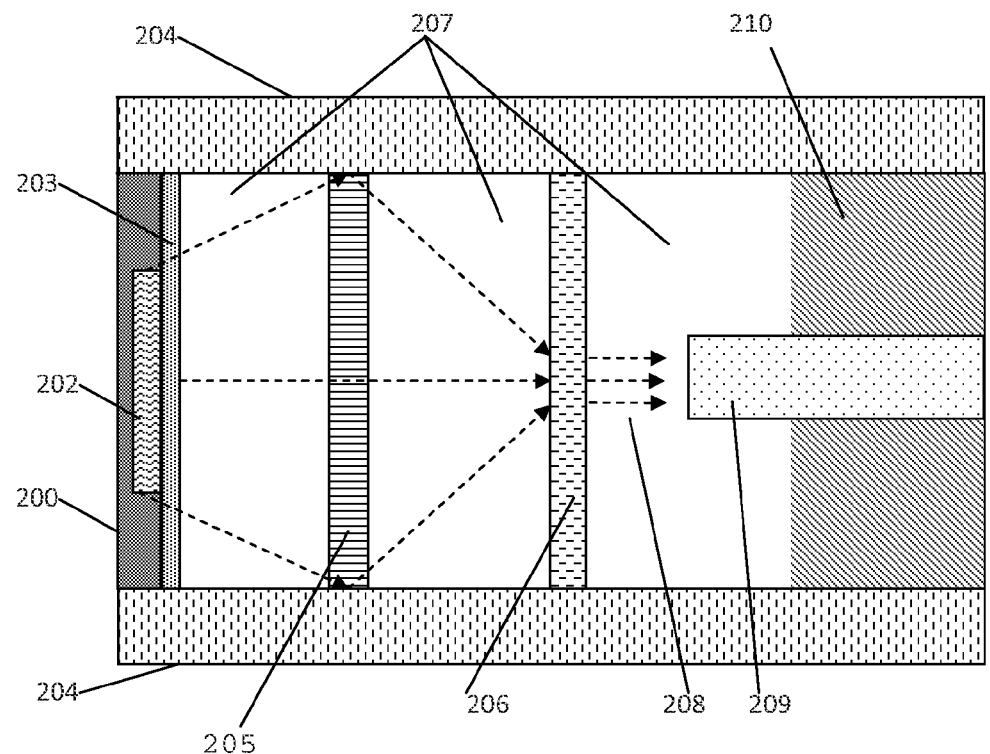
FIG. 2 illustrates a cross-sectional isometric perspective view of an exemplary embodiment.

FIG. 2 illustrates a cross-sectional isometric perspective view of an exemplary embodiment. A light source 202 can be integrated with, mounted into and/or packed within a package substrate 200. An interface 203 such as an air gap or adhesive can be provided between the optical cavity 207 and the light source 202. An outer casing 204 of the optical assembly can serve as an enclosure for the light source 202, beam forming stages such as 205 and 206 (although n number beam forming stages can be included in other example embodiments), fiber cable core 209 and outer layer and 210. A function of the beam forming stage is to reformat the incoming light into a designed shape. A beam forming stage (e.g. can include 205, 206 and other beam forming systems) can be made up of one or more optical components (not shown). Beam forming stage 206 can be the 'nth' beam forming stage (where n is a number greater than 1). The output of beam forming stage 206 can be a collimated beam 208. The diameter of collimated beam 208 can be substantially equal to that of the diameter of the optical fiber cable core 209. Optical cavity 207 can be comprised of air or some other optically transparent material, The beam from light source 202 can propagate through optical cavity 207, into the various beam forming stages (e.g. 205 and 206) and finally into the optical fiber cable core 209. As used herein, an optical fiber cable can refer to a cable containing one or more optical fibers. The optical fiber elements can be individually coated with plastic layers and/or contained in a protective tube suitable for the environment where the cable can be deployed.

Figure 3:
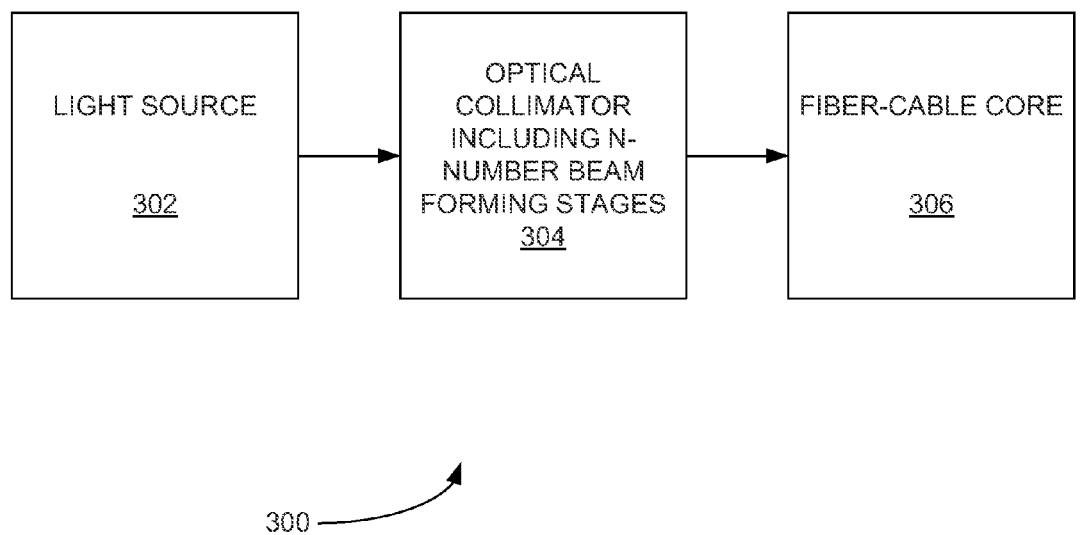
FIG. 3 depicts a block diagram of a system for provided a collimated beam into a fiber-cable core according some embodiments.

FIG. 3 depicts a block diagram of a system 300 for providing a collimated beam into a fiber-cable core according to some embodiments. System 300 includes a light source 302. Light source 302 can include an optical transmitter (or receiver) that provides an optical signal. Light source 302 provides the optical signal to optical collimator 304. Optical collimator 304 can include n-number (where n is >=1) beam forming stages. In the beam forming stages, the diverging radiation from the optical transmitter may be subjected to one or more of the following steps: focusing the optical signal's beam, defocusing the optical signal's beam, collimating the optical signal's beam. These steps may be repeated as necessary so that the maximum number of photons could be made available at the optical collimator 304. The lenses in the optical collimator 304 can be of any suitable material such as plastic and/or glass (or any combination thereof). The collimated beam can then be available at the entrance of the optical cavity of the fiber-cable core 306. The diameter of the collimated beam can be substantially equal or slightly larger than the optical core. For example, in a single mode fiber, if the optical core is 9 micrometers, the diameter of the collimated beam can be approximately fifty-percent (50%) larger. Adjustments to beam diameter can also be made according to the tolerance of the casing. For example, if the casing tolerance is around five to ten percent (5%-10%), then the collimated beam may be adjusted to a size greater than fifty percent of the optical core diameter. Similar sizing adjustments can be made in the case of a multimode fiber such as in a parallel fiber optic cable, duplex fiber optic cables and the like, The parallel fiber optic cable can include multiple strand of fiber optic cable and used to transmit data (such as in a parallel data format). The various elements of system 300, such as the optical collimator 304, can be packaged in an optic assembly outer casing (not shown in FIG. 3). The outer casing can be an outer enclosure of the beam forming optical assembly unit. Typically, the inner diameter of the Optic assembly outer casing will be very close to that of the outer diameter of the fiber optic cable. The outer casing can hold the fiber optic cable in its place. It is noted that the modules of FIG. 3 can be implemented in a single package in one example embodiment and as modular components in another example embodiment.

CONCLUSION

Although the present embodiments have been described with reference to specific example embodiments, various modifications and changes can be made to these embodiments without departing from the broader spirit and scope of the various embodiments. Accordingly, the specification and drawings are to be regarded in an illustrative rather than a restrictive sense. Other variations of the present designs may be made.

The methods and systems described herein are not limited to a particular hardware or software configuration, and may find applicability in many computing or processing environments. The methods and systems can be implemented in hardware or software, or a combination of hardware and software.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate' be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, can be made by those skilled in the art. Accordingly, it will be understood that the present disclosure is not to be limited to the embodiments disclosed herein, can include practices otherwise than specifically described, and is to be interpreted as broadly as allowed under the law.

What is claimed is:

1. An optical coupler of a fiber optic system comprising:
a light-source input cavity packaged in an outer casing, wherein the light-source input cavity receives an optical signal from a light source;
an optical collimator packaged in the outer casing such that a receiving end of the optical collimator receives the light source from the light-source input cavity, wherein the optical collimator comprises at least one beam forming stage, wherein the optical collimator generates a collimated beam output from the optical signal; and
an optical cavity that receives the collimated beam output of the optical collimator, wherein the optical cavity is coaxially included in a receiving optical fiber coupled with the outer casing, coupled with the optical cavity, wherein the optical cavity receives the collimated beam output of the optical collimator and inputs the collimated beam into the receiving optical fiber, wherein the input collimated beam is parallel to the longitudinal direction of the optical fiber receiving cavity's core, and wherein the light source, a package substrate containing the light source and the input end of the optical fiber receiving cavity are all concentrically located completely within the confines of the outer casing of a single packaging unit.

2. The optical coupler of claim 1, wherein a central aperture of the optical collimator is substantially coaxial with an aperture of the optical cavity an aperture of the light-source input cavity.

3. The optical coupler of claim 1, wherein the outer casing comprises a cavity for receiving the receiving optical fiber.

4. The optical coupler of claim 1, wherein the collimated beam output comprises a narrow collimated beam.

5. The optical coupler of claim 1, wherein the optical cavity is directly connected to a core of the receiving optical fiber.

6. The optical coupler of claim 1, wherein the optical coupler is enclosed in an optical assembly unit.

7. The optical coupler of claim 1, wherein the outer casing of the optical coupler is physically attached to optical transmitter unit that comprises the light source.

8. The optical coupler of claim 7, wherein the optical transmitter unit is physically attached to the opposite end of the optical coupler, relative to the end where receiving optical fiber is attached to the optical coupler.

9. A method of a fiber optic system comprising:
- obtaining a fiber-optic light source input with an optical collimator device;
- collimating, with the optical collimator device, the fiber-optic light source input into a collimated beam;
- inputting the collimated beam into a receiving optical cavity;
- collimating, with the optical collimator device, the light source input into the collimated beam, wherein the input collimated beam is parallel to the longitudinal direction of the optical fiber receiving cavity's core, and wherein the light source, a package substrate containing the light source and the input end of the optical fiber receiving cavity are all concentrically located completely within the confines of the outer casing of a single packaging unit.

10. The method of claim 9, wherein the optical collimator device comprises one or more beam forming stages.

11. The method of claim 9, further comprising:
- collimating, with the optical collimator device, the light source input into the collimated beam with a diameter slightly larger than the diameter of the receiving optical cavity of the fiber optic fiber.

12. The method of claim 9, wherein the diameter of the collimated beam is substantially fifty percent larger than the diameter of the receiving optical cavity of the fiber optic fiber.

* * * * *